R. J. TOWER.
EDGER.
APPLICATION FILED APR. 27, 1908.

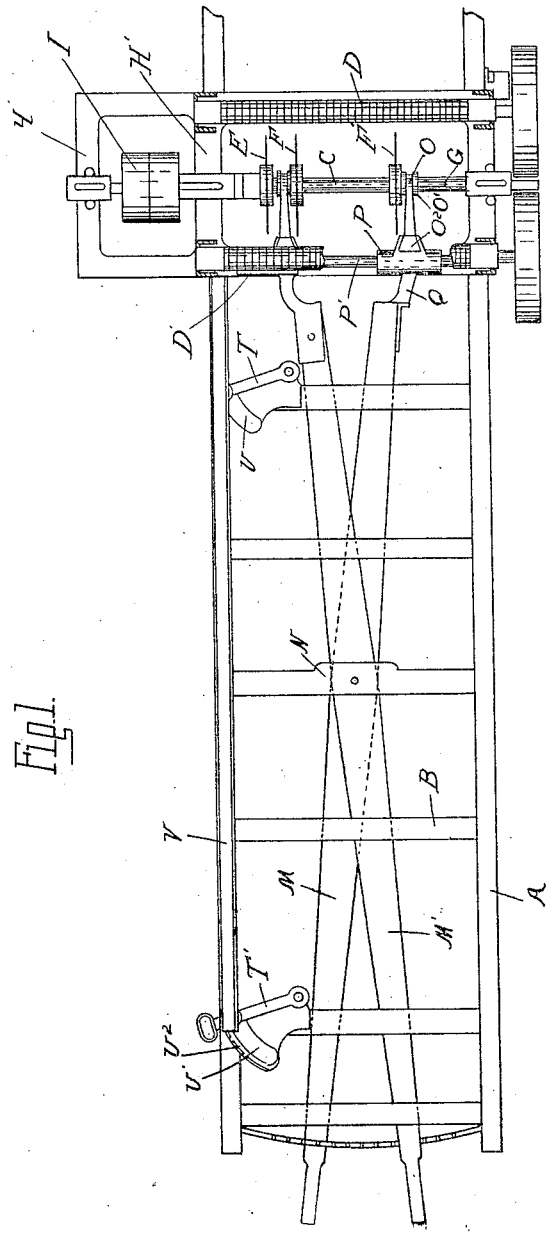

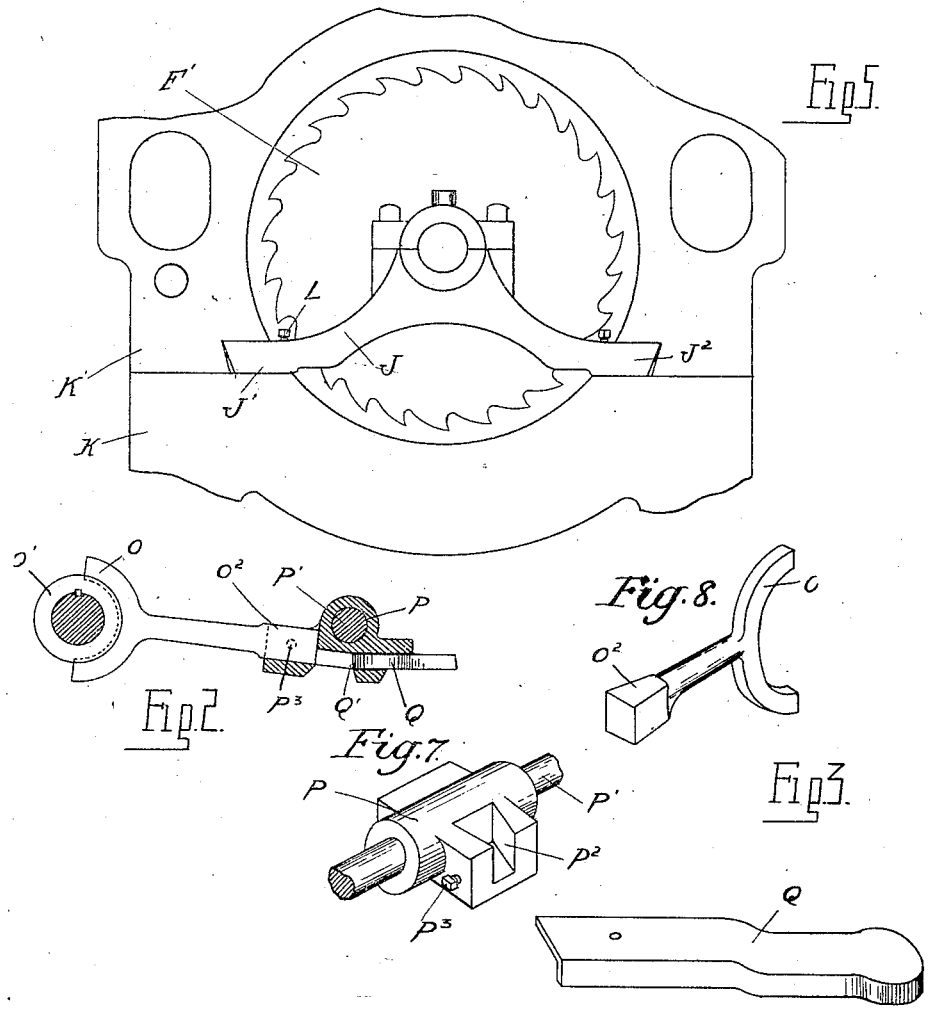

1,111,331.

Patented Sept. 22, 1914.
3 SHEETS—SHEET 3.

Witnesses
W. K. Ford
James P. Barry

Inventor
Ray J. Tower
By Whittemore, Hulbert & Whittemore
attys

UNITED STATES PATENT OFFICE.

RAY J. TOWER, OF GREENVILLE, MICHIGAN, ASSIGNOR OF ONE-HALF TO THE GORDON HOLLOW BLAST GRATE COMPANY, OF GREENVILLE, MICHIGAN, A CORPORATION OF MICHIGAN.

EDGER.

1,111,331.  Specification of Letters Patent.  Patented Sept. 22, 1914.

Application filed April 27, 1908. Serial No. 429,342.

*To all whom it may concern:*

Be it known that I, RAY J. TOWER, a citizen of the United States of America, residing at Greenville, in the county of Montcalm and State of Michigan, have invented certain new and useful Improvements in Edgers, of which the following is a specification, reference being had therein to the accompanying drawings.

The invention relates to edgers and consists in certain features of construction, with particular reference to the means employed for shifting the saw or saws upon the arbor, for quickly removing such saw or saws at any time, and for adjusting the movable guide, these objects being attained by means of the construction, arrangement and combination of parts as hereinafter set forth.

Figure 4:
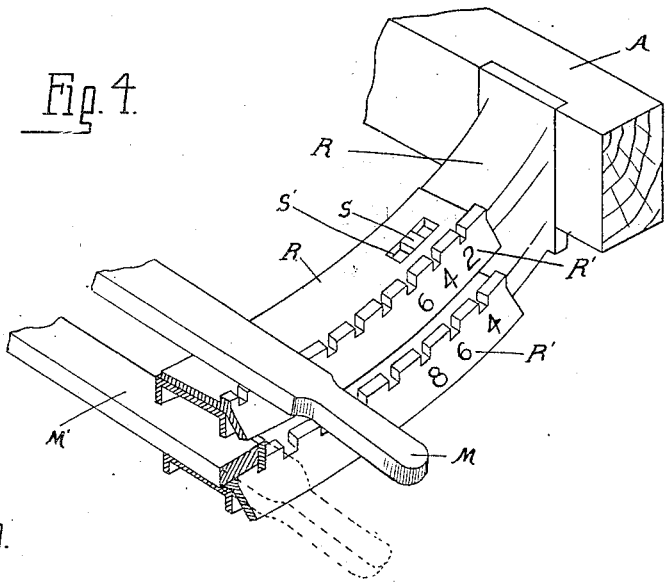
Figure 6:
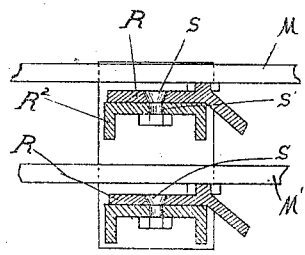

In the drawings—Figure 1 is a plan view of the edger; Fig. 2 is a section longitudinally of the frame through the arbor and the saw shifting arm; Fig. 3 is a perspective view of the detached parts of the saw shifting arm; Fig. 4 is a perspective view of the adjustable index and lever lock; Fig. 5 is an end elevation of a portion of the frame; and Fig. 6 is a cross section through the index and lever lock.

My improved machine belongs to the type of edgers in which a stationary and one or more adjustable saws are mounted upon the arbor, the adjustable saw being shiftable during operations by levers actuated from the forward end of the bed. It is important that this adjusting mechanism should be accurate in its operation and free from any lost motion or flexing of the parts which would result in variation in the work. It is also necessary for the saws to be removable, and it is highly desirable that this detachment should be accomplished as easily and expeditiously as possible. This result I have attained by the following construction:

A is the bed or frame upon which is mounted the work supporting rolls B.

C is the arbor and D and D' are driven feed rolls upon opposite sides thereof.

E is the saw mounted in fixed position upon the arbor, and F and F' are the shiftable saws which are slidable along the arbor on a spline G.

One end of the arbor C is mounted in fixed bearings H and H' upon the frame between which is arranged the driven pulley I. The opposite end of the arbor is supported by a removable bearing which is detached to permit of engaging or disengaging the saws from the arbor. To permit of quickly removing this bearing I preferably construct the same of a bracket J having the legs J' and J² thereof arranged to engage recesses between adjoining sections K and K' of the frame. Set screws L are also provided which engage threaded apertures in the legs J' and J² and bear against the lower frame member K. Thus when these set screws are tightened the bracket J will be clamped against the shoulder upon the upper frame member K' so as to be held rigidly in position, but at any time it may be quickly removed by merely loosening the set screws which being on the top of the bracket are easily accessible.

The shiftable saws F and F' are adjusted by means of the levers M M' which are centrally pivoted to a cross girt N on the frame A. The inner ends of these levers engaging the saws are connected to the saws through the medium of arms which either directly embrace the saws or engage grooved collars to which the saws are secured. The latter construction is illustrated in Figs. 1 and 3 in which O are arms bifurcated to embrace the collar O' and engage the groove therein. P is a slidable bearing to which the arm O is secured, said bearing being sleeved upon a guide rod P' on the frame. Q is an arm secured to the inner end of each of the levers M and M' and engages a recess Q' in the slidable bearing P. Thus whenever the lever M is shifted the bearing P will be slid along the guide P' and the arm O moving therewith will shift the saw upon the arbor. It is, however, necessary that the arm O should be detachable from the collar O' to permit of the removal of the saw. This I have accomplished by an exceedingly simple construction in which the arm O is formed of a separate member from the bearing P, and has at its rear end a portion O² which is laterally engageable with a socket P² on the member P. The member O² is preferably of wedge shape section and drops in to the socket P² from the top, so that it may be readily engaged or disengaged. To secure these members from accidental disengagement a set screw P³ is arranged at one side of the socket P² which may be tightened to clamp the member O².

To facilitate the cutting of the lumber to exact size, a scale or index is arranged adjacent to the handle ends of the lever M. This index is formed by a notched segment R which has a series of numerals or other indications R' by which the workmen may set the levers for any desired size of work. It is obvious that the accuracy of the work depends on the accuracy of the relative position of this segment, the fulcrum for the levers and the mounting of the work guide upon the frame. I have, however, avoided the necessity of exact workmanship in the construction and mounting of these parts by providing an adjustment for the segments R relative to the cross girt R² of the frame upon which they are mounted, thereby permitting of exactly positioning the segments after the completion of the mechanical structure. As shown, the cross girt R² is formed of upper and lower parallel bars upon which are mounted the segments R respectively for the levers M M'. Each of these segments is secured to the girt by clamping bolts S which engage slots S' in the segments and are preferably provided with tapered heads for firmly holding the parts when tightened. Thus by loosening the bolts S the segments may be accurately positioned and by then clamping the bolts they will be held in this position. A further advantage of having the segments adjustable is to enable the lumber to be edged or ripped scant, exact or plump, as may be desired. Instead of having the indexes at the front end of the machine, they may be over or near the saws, if preferred.

At one side of the frame A is arranged an adjustable edge guide for the work. This consists of a pair of parallel rock arms T and T', which are pivotally secured to segments U and U' which are mounted upon cross girts of the frame A. V is a guide bar which is pivotally connected to the rock arms T and T', and is swung thereby into different positions of adjustment, all of which will be parallel with the saws. One of the segments U' is provided with a notched flange U² with which the arm T' may be engaged to hold the guide in different positions of adjustment.

As the operation of this type of machine is well understood, I deem it unnecessary to further describe the same. However, I desire to emphasize the fact that the construction above described is one which is exceedingly simple and inexpensive to manufacture, while at the same time accuracy in operation and ease in exchanging the saws is secured.

What I claim as my invention is:

1. The combination with an arbor and a saw shiftable thereon, of a guide parallel to said arbor, a member slidable on said guide having a recess therein below the top portion thereof, whereby said top portion overlies said recess, a detachable arm for coupling said member to said saw, a lever, and an arm on said lever having a part positioned in said recess whereby the lever is pivotally connected to said member.

2. The combination with an arbor and a saw shiftable thereon provided at one side thereof with a thrust collar, of a guide parallel to said arbor, a member slidable on said guide having a wedge-shaped socket opening on one side of the guide member, said slidable member having a terminal recess with the top wall of the member overlying said recess, an arm having a wedge-shaped portion for engaging said socket and bifurcated at its opposite end to engage the thrust collar on said saw, a lever, and an arm on said lever loosely engaging in said recess of the slidable member.

In testimony whereof I affix my signature in presence of two witnesses.

RAY J. TOWER.

Witnesses:
 CRAIG WALKER,
 ELVA S. FRIES.